(12) United States Patent
Turner, Jr.

(10) Patent No.: US 11,117,608 B2
(45) Date of Patent: Sep. 14, 2021

(54) ALL-TERRAIN PLATFORM DOLLY

(71) Applicant: Eddie Lee Turner, Jr., Sevierville, TN (US)

(72) Inventor: Eddie Lee Turner, Jr., Sevierville, TN (US)

(*) Notice: Subject to any disclaimer, the term of this patent is extended or adjusted under 35 U.S.C. 154(b) by 0 days.

(21) Appl. No.: 16/647,946

(22) PCT Filed: Jul. 30, 2018

(86) PCT No.: PCT/US2018/000124
§ 371 (c)(1),
(2) Date: Mar. 17, 2020

(87) PCT Pub. No.: WO2020/027765
PCT Pub. Date: Feb. 6, 2020

(65) Prior Publication Data
US 2020/0262461 A1 Aug. 20, 2020

(51) Int. Cl.
B62B 5/00 (2006.01)

(52) U.S. Cl.
CPC ........ B62B 5/0093 (2013.01); *B62B 2206/04* (2013.01)

(58) Field of Classification Search
CPC . B62B 5/0093; B62B 5/0083; B62B 2206/04; B62B 2206/02
See application file for complete search history.

(56) References Cited

U.S. PATENT DOCUMENTS

| 1,300,533 | A | 4/1919 | Wessinger |
| 2,763,491 | A | 9/1956 | Shafer, Jr. |
| 2,788,220 | A | 4/1957 | Christensen |

(Continued)

FOREIGN PATENT DOCUMENTS

| CA | 2258380 C | 7/1999 |
| CN | 204447217 U | 7/2015 |

(Continued)

OTHER PUBLICATIONS

PCT, International Search Report, PCT/US2018/000124, dated Dec. 6, 2018 (2 pages).

(Continued)

*Primary Examiner* — John D Walters
(74) *Attorney, Agent, or Firm* — McAndrews, Held & Malloy, Ltd.

(57) ABSTRACT

An adjustable all-terrain dolly system (100) having a chassis assembly (110) that includes a frame (120) which has a right-side rail (122), a left-side rail (124), a first-adjustable cross member (126) and a second-adjustable cross member (128), and a first-rolling assembly (160) to include a first-set of inline wheels (164) and a second-rolling assembly to include a second-set of inline wheels (174) and at least one adjustable-locking mechanism (180). The frame of the dolly system defines a load-supporting platform, and the platform has a length which is at least about twice the front-to-rear length of each of the two sets of wheels. Furthermore, each wheel of the dolly system has a peripheral surface which is shaped to engage the underlying surface at a substantially single point to enhance the maneuverability of the dolly.

17 Claims, 5 Drawing Sheets

(56) References Cited

U.S. PATENT DOCUMENTS

| | | | |
|---|---|---|---|
| 3,061,327 A * | 10/1962 | Ensinger | B62B 5/0083 |
| | | | 280/35 |
| 3,215,382 A | 11/1965 | Stein | |
| 3,331,613 A | 7/1967 | Popelka | |
| 3,488,062 A | 1/1970 | Walda | |
| 3,522,951 A | 8/1970 | Tyson | |
| 3,775,783 A | 12/1973 | Miller | |
| 4,166,638 A | 9/1979 | De Prado | |
| 4,178,006 A | 12/1979 | Johnson | |
| D286,255 S | 10/1986 | Gage | |
| 4,801,152 A | 1/1989 | Elliott | |
| 4,921,264 A | 5/1990 | Duffy | |
| 5,018,930 A | 5/1991 | Hardin | |
| 5,228,716 A * | 7/1993 | Dahl | B62B 1/002 |
| | | | 280/47.18 |
| 5,249,823 A | 10/1993 | McCoy | |
| 5,299,817 A | 4/1994 | Chang | |
| 5,486,014 A | 1/1996 | Hough | |
| 5,599,031 A | 2/1997 | Hodges | |
| 5,707,068 A | 1/1998 | Bradfield | |
| 5,779,252 A | 7/1998 | Bolton, Jr. | |
| 5,855,385 A | 1/1999 | Hambsch | |
| 5,863,053 A | 1/1999 | Berry | |
| 5,938,217 A | 8/1999 | Wintz | |
| D415,868 S | 10/1999 | Hewitt | |
| 6,095,533 A | 8/2000 | Balolia | |
| 6,109,625 A | 8/2000 | Hewitt | |
| 6,203,031 B1 | 3/2001 | Leverington | |
| 6,206,385 B1 | 3/2001 | Kem | |
| 6,371,496 B1 | 4/2002 | Balolia | |
| 6,371,497 B1 | 4/2002 | Scire | |
| 6,783,147 B1 * | 8/2004 | Green, Sr. | B62B 1/20 |
| | | | 280/47.26 |
| 6,824,150 B2 | 11/2004 | Simione | |
| 7,036,833 B1 | 5/2006 | Berna | |
| 7,213,820 B2 | 5/2007 | Drummond | |
| 7,300,063 B1 | 11/2007 | Prizmich | |
| D594,622 S | 6/2009 | Kissun | |
| 7,762,198 B2 | 7/2010 | Rasmusson | |
| 7,854,435 B2 | 12/2010 | Campbell | |
| 8,002,510 B2 | 8/2011 | Williams | |
| 8,025,299 B2 | 9/2011 | Hiltz | |
| 8,850,656 B2 | 10/2014 | Bernal | |
| 8,876,145 B1 | 11/2014 | Bernal | |
| 9,010,798 B2 | 4/2015 | Buttazzoni | |
| 9,027,942 B2 | 5/2015 | Hasegawa | |
| 9,364,093 B2 | 6/2016 | Williams | |
| 9,409,585 B2 | 8/2016 | Buttazzoni | |
| 9,522,763 B2 | 12/2016 | Roman | |
| 2003/0098552 A1 | 5/2003 | Hsiao | |
| 2004/0227316 A1 | 11/2004 | Drummond | |
| 2007/0210545 A1 | 9/2007 | Klotz | |
| 2007/0222165 A1 | 9/2007 | Hope | |
| 2012/0126085 A1 | 5/2012 | Johnson | |
| 2013/0154216 A1 | 6/2013 | Paulk, Sr. | |
| 2013/0187352 A1 | 7/2013 | Hassell | |
| 2014/0021691 A1 | 1/2014 | Buttazzoni | |
| 2014/0103615 A1 | 4/2014 | Tsai | |
| 2014/0210188 A1 | 7/2014 | Buttazzoni | |
| 2014/0300070 A1 | 10/2014 | Veronie | |
| 2016/0137215 A1 | 5/2016 | Ondrasik | |
| 2017/0151973 A1 | 6/2017 | Buttazzoni | |
| 2017/0217466 A1 | 8/2017 | Buttazzoni | |
| 2018/0222511 A1 | 8/2018 | Turner, Jr. | |
| 2019/0126967 A1 * | 5/2019 | Sanders | B62B 5/067 |

FOREIGN PATENT DOCUMENTS

| | | |
|---|---|---|
| EP | 3044079 A1 | 7/2016 |
| FR | 548795 A | 1/1923 |
| JP | S62 129363 U | 8/1987 |
| WO | 2010/027919 A2 | 3/2010 |

OTHER PUBLICATIONS

European Patent Office, Communication with extended European search report in Application No. 18928900.2, dated Sep. 28, 2020 (7 pages).

Australian Government IP Australia, Examination report No. 1 in Application No. 2018434893, dated Dec. 8, 2020 (7 pages).

\* cited by examiner

ALL-TERRAIN PLATFORM DOLLY

CROSS-REFERENCE TO RELATED APPLICATIONS/INCORPORATION BY REFERENCE

The present application is a 371 national phase of Application No. PCT/US18/00124, filed Jul. 30, 2018. The above-identified application is hereby incorporated herein by reference in its entirety.

BACKGROUND OF THE INVENTION

The present invention relates generally to the field of platform dollies and relates, more specifically, to a dolly having a load-supporting platform upon which a load can be positioned for transport by way of the dolly.

DESCRIPTION OF RELATED ART

Commonly-used platform dollies cannot handle rough terrain efficiently and, even if adjustable, cannot be expanded easily and typically, are not multi-functional. Additionally, dollies are likely not to move in a single desired direction when pushed and are, instead, likely to move in any of a number of undesired directions. Furthermore, conventional dollies are commonly difficult to load, and often, the load is not easily maintained on the dolly. A suitable solution is desired.

U.S. Pat. No. 4,166,638 to Alfred De Prado relates to an adjustable dolly. The described adjustable dolly includes a wheeled platform base of adjustable length, is fitted with straps for securing a load to a base, and is provided with projecting handles mounted to an end wall of the base. Shoulder padding is fixed under the base to enable a household mover to lift and support an end of the carriage on his shoulder for the moving of items of furniture placed on the base.

U.S. Pat. No. 5,599,031 to Douglas Hodges relates to a work dolly having adjustable height, width and length. The work dolly having adjustable height, width and length includes a dolly for movably supporting a load having an adjustable frame with side members and end members. Each side member and end member consists of slidable sections in telescoping relationship for adjusting length and width of the frame. A wheeled support is carried on the underside of the frame for transport purposes.

SUMMARY OF THE INVENTION

In view of the foregoing disadvantages inherent in the known platform dolly art, the present disclosure describes novel adjustable all-terrain dolly system.

In particular, this invention resides in a dolly which facilitates the transport of a load across a floor or underlying surface. The dolly includes a chassis assembly defining an elongated load-supporting platform and including a forward edge and an opposite rearward edge, and the chassis assembly includes a frame including two opposite side rails which extend between the forward edge and the rearward edge of the platform, and the platform has a fore-to-aft length as measured between the forward edge and the rearward edge thereof. In addition, two sets of floor-engaging wheels are joined to the frame and are arranged beneath the load-supporting platform of the chassis assembly wherein one of the two sets of floor-engaging wheels is disposed adjacent one of the two opposite side rails and a second set of wheels is disposed adjacent the other of the two opposite side edges of the frame. Further, the wheels of each of the two sets of wheels are arranged inline with one another and include a forwardmost wheel, a rearwardmost wheel and least one intermediate wheel disposed between the forwardmost and rearwardmost wheels. Each of the two sets of wheels has a front-to-rear length as measured between the front of the forwardmost wheel and the rear of the rearwardmost wheel; and each of the two sets of wheels is substantially centered between the forward and rearward edges of the platform. Further still, the front-to-rear length of each of the two sets of wheels is about one-half of the fore-to-aft length of the platform so that an appreciable portion of the platform extends between the front of the forwardmost wheel of each set of wheels and the forward edge of the platform, and an appreciable portion of the platform extends between the rear of the rearwardmost wheel of each set and the rearward edge of the platform. Moreover, each wheel of the two sets of wheels has a peripheral surface for engaging the floor or underlying surface as the dolly is rolled therealong, and the peripheral surface of each wheel has a transverse cross section which is shaped so that as the dolly is rolled along the floor or underlying surface, the peripheral surface of each wheel engages the floor or underlying surface at a substantially single point to enhance the maneuverability of the dolly as the dolly is rolled across the floor or underlying surface.

It has been found that the dolly described therein provides an efficient means for transporting items over difficult terrains. Moreover, the dolly operates reliably and can be manufactured at a relatively modest expense. These and other features, aspects, and advantages of the present invention will become better understood with reference to the following drawings and detailed description.

BRIEF DESCRIPTION OF THE DRAWINGS

The figures which accompany the written portion of this portion of the specification illustrate embodiments and methods of use for the present disclosure, an adjustable all-terrain dolly system, constructed and operative according to the teachings of the present disclosure.

The various embodiments of the present invention will hereinafter be described in conjunction with the appended drawings, wherein like designations denote like elements.

DETAILED DESCRIPTION OF AN ILLUSTRATIVE EMBODIMENT

As discussed above, embodiments of the present disclosure relate to a platform dolly and more particularly to an adjustable all-terrain dolly as used to improve the transportation of different loads over a variety of terrains.

Generally speaking, in preferred embodiments, the adjustable all-terrain dolly system cradles the load, allowing the user to set the width of the load, tilt the load and set the load onto the dolly system. This allows the user to easily transport a variety of items like a washing machine, dishwasher or the like. Additionally, a user could add an attachment to the adjustable all-terrain dolly system like a cart in order to haul loose items.

Figure 1:
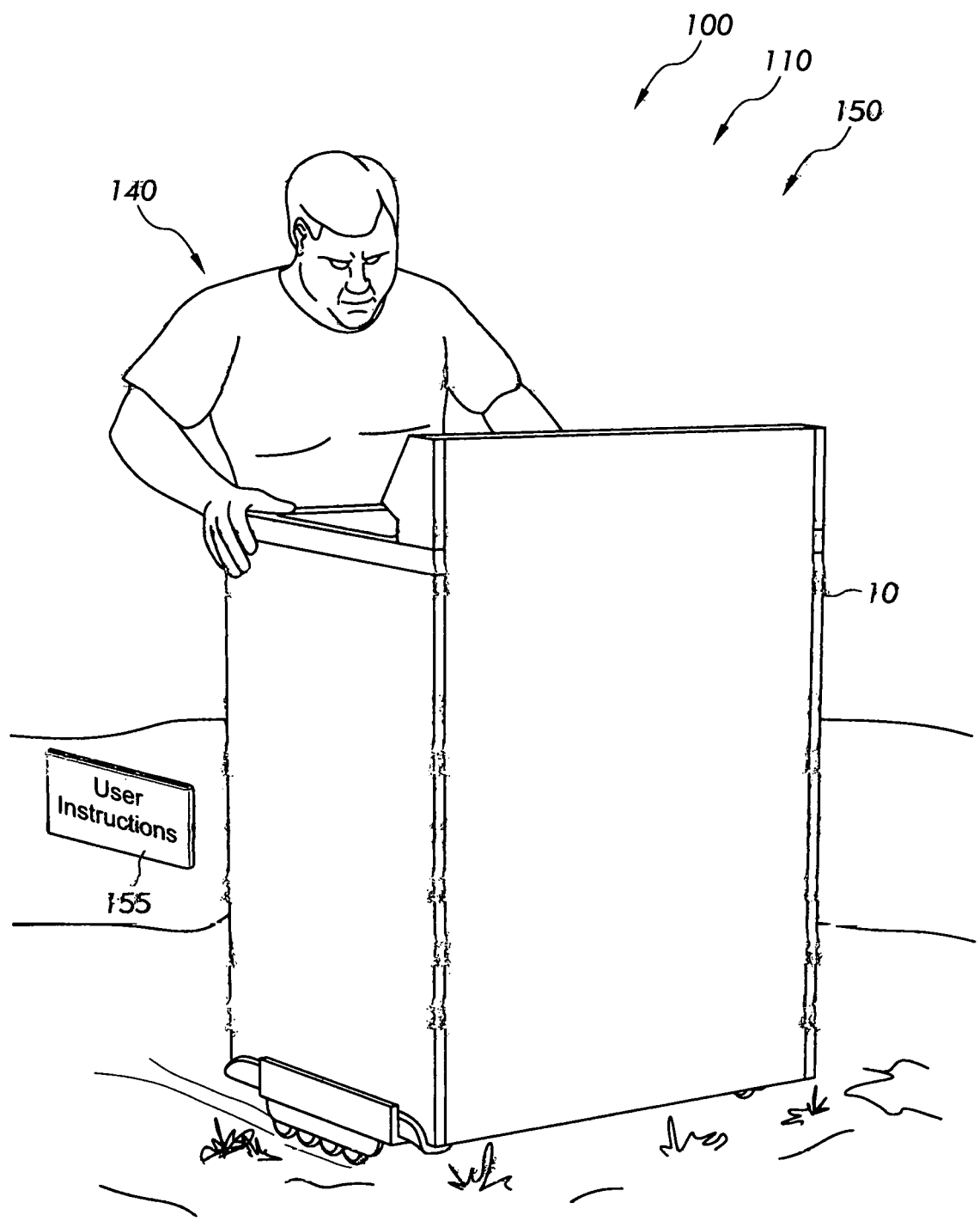
FIG. 1 is a perspective view of an adjustable all-terrain dolly system during an "in-use" condition, according to an embodiment of the disclosure.

Referring now more specifically to the drawings by numerals of reference, there is shown in FIGS. 1-4, various views of an adjustable all-terrain dolly system 100. FIG. 1 shows an adjustable all-terrain dolly system 100 during an "in-use" condition 150, according to an embodiment of the present disclosure. Here, the adjustable all-terrain dolly system 100 may be beneficial for use by a user 140 to transport heavy items over a terrain. As illustrated, the adjustable all-terrain dolly 100 may include: a chassis assembly 110 that includes a frame 120 which has a right-side rail 122, a left-side rail 124, a first-adjustable cross member 126 and a second-adjustable cross member 128, and a first-rolling assembly 160 to include a first-set of inline wheels 164 and a second-rolling assembly 170 to include a second-set of inline wheels 174 and at least one adjustable-locking mechanism 180.

According to one embodiment, the adjustable all-terrain dolly system 100 may be arranged as a kit 105. In particular, the adjustable all-terrain dolly system 100 may further include a set of instructions 155. The instructions 155 may detail functional relationships in relation to the structure of the adjustable all-terrain dolly system 100 (such that the adjustable all-terrain dolly-system 100 can be used, maintained, or the like, in a preferred manner).

Figure 2:
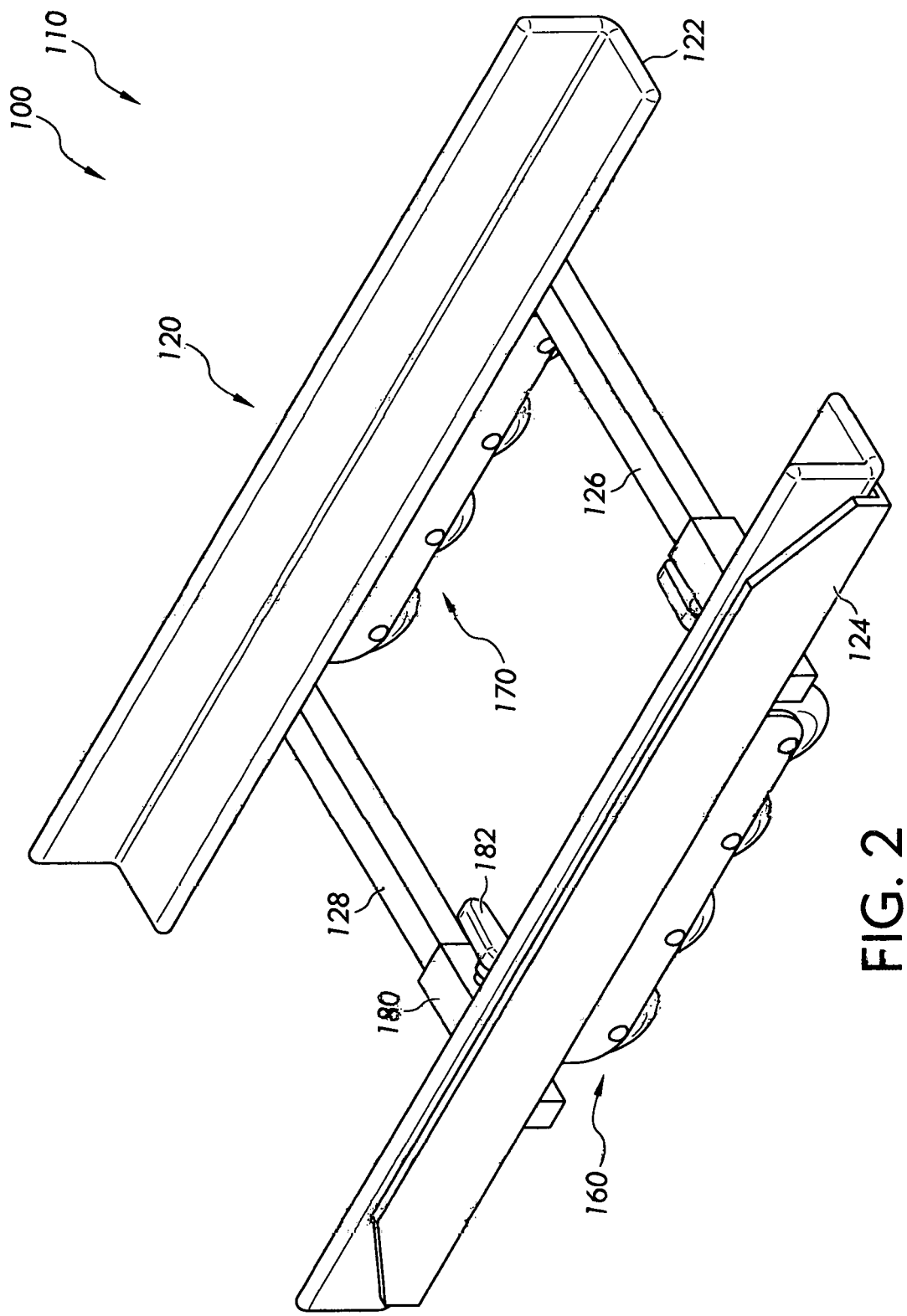
FIG. 2 is a top perspective view of the adjustable all-terrain dolly system of FIG. 1, comprising a chassis assembly according to an embodiment of the present disclosure.

FIG. 2 shows a top perspective view of the adjustable all-terrain dolly system 100 of FIG. 1, according to an embodiment of the present disclosure. As shown, the adjustable all-terrain dolly system 100 may include a chassis assembly 110 that includes a frame 120 which has a right-side rail 122, a left-side rail 124, a first-adjustable cross member 126 and a second-adjustable cross member 128, and a first-rolling assembly 160 to include a first-set of inline wheels 164 and second-rolling assembly 170 to include a second-set of inline wheels 174 and at least one adjustable-locking mechanism 180.

The right-side 122 to perpendicular to first-adjustable cross member 126 and left-side rail 124 is perpendicular to second-adjustable cross member 128. The first-rolling assembly 160 is structurally connected to the right-side rail 122 and the second-rolling assembly 170 is structurally connected to the right-side rail 122, respectively. The right-side rail 122 is parallel to the left-side rail 124 and the first adjustable cross member 126 is parallel to the second-adjustable cross member 128. At least one adjustable-locking mechanism 180 is joined to a first-proximal end of the first-adjustable cross member 126. At least one adjustable-locking mechanism is joined to a second-proximal end of the second-adjustable cross member 128. The adjustable all-terrain dolly system 100 is configured to transport a load 10 over a surface.

The first-rolling assembly 160 and the second-rolling assembly 170 are linearly aligned and modular. The first-rolling assembly 160 and the second-rolling assembly 170 each comprise at least two wheels in linear orientation. The at least two wheels in linear orientation are coupled to at least one track 162. At least one track 162 each comprises a wheel-skirt 163. In a preferred embodiment, first-rolling assembly 160 and the second-rolling assembly 170 each comprises exactly four wheels in a linear orientation. The four wheels in linear orientation maintain a common plane during use relative to each other.

Figure 3:
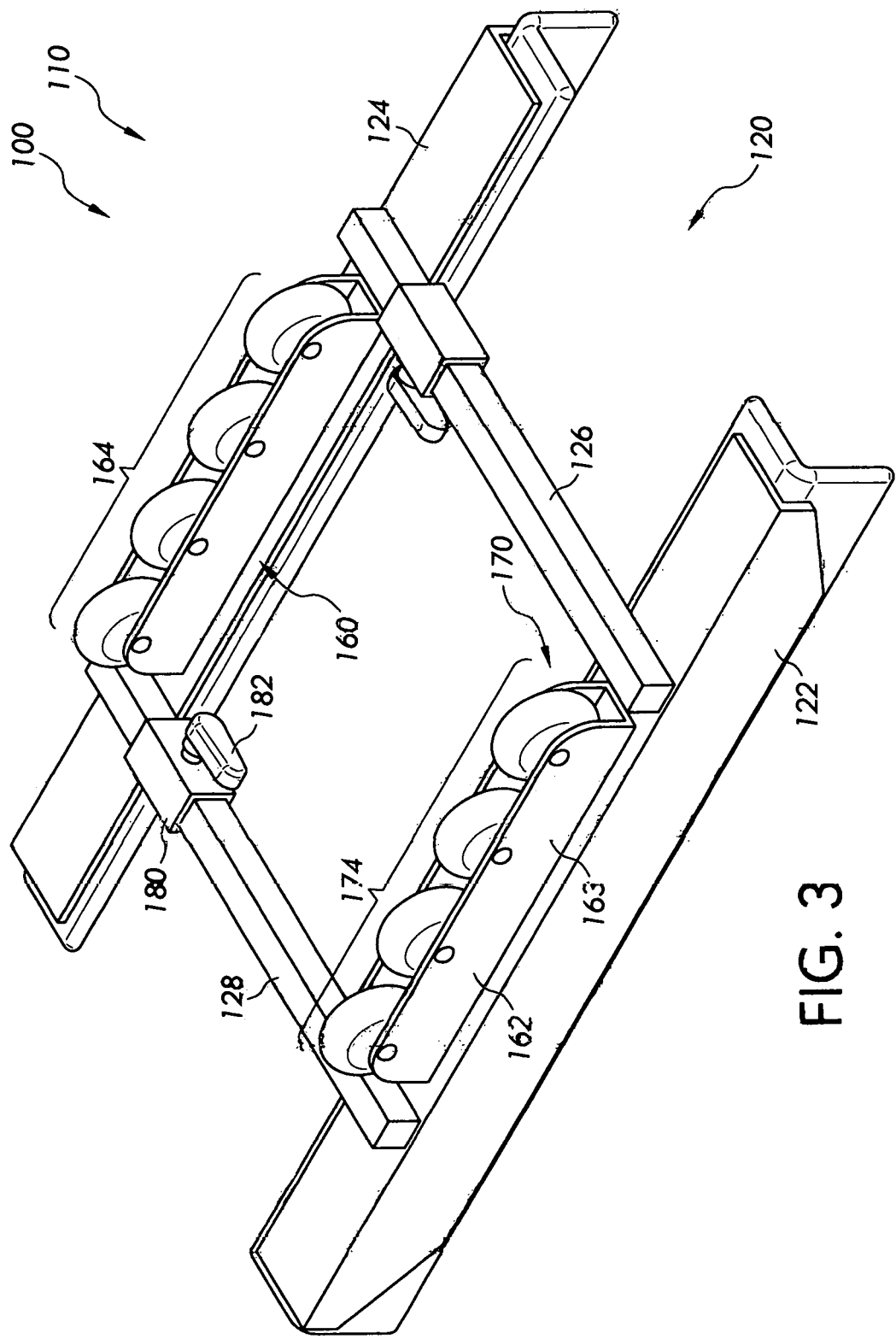
FIG. 3 is a bottom perspective view of the chassis assembly of FIG. 1, according to an embodiment of the present disclosure.

FIG. 3 is a bottom perspective view of the chassis assembly 110 of FIG. 1, according to an embodiment of the present disclosure. The first-adjustable cross member 126 and second-adjustable cross member 128 are telescopically extendable and retractable. The right-side rail 122 is adjustable relative to the left-side rail 124 to a maximum of forty-two inches via moving the first-adjustable cross member 126 and the second-adjustable cross member 128 in relation to each other.

Figure 4:
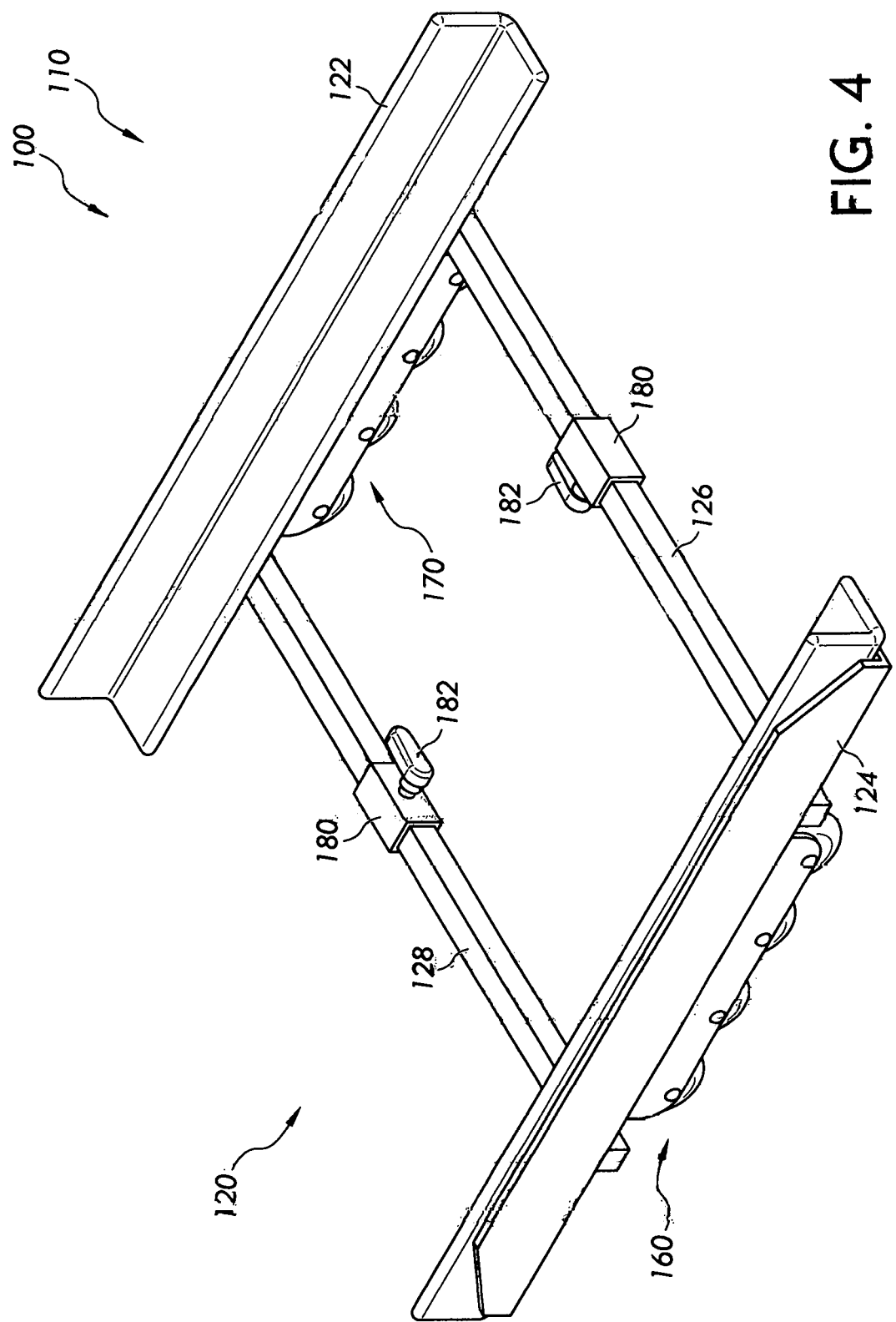
FIG. 4 is a top perspective view of the chassis assembly of FIG. 1 in an expanded form, according to an embodiment of the present disclosure.

FIG. 4 is a top perspective view of the chassis assembly 110 of FIG. 1, according to an embodiment of the present disclosure. The chassis assembly 110 comprises in functional combination, the frame 120, the first-rolling assembly 160, the second-rolling assembly 170, and at least one adjustable-locking mechanism 180. The frame 120 is structurally defined by a right-side rail 122, a left-side rail 124, a first adjustable cross member 126, and a second-adjustable cross member 128. The frame 120 comprises a platform.

At least one adjustable-locking mechanism 180 comprises a rotatable fastener 182. The rotatable fastener 182 comprises at least one wing by which to manipulate the rotatable fastener 182 in relation to the first-adjustable cross member 126 and the second-adjustable cross member 128. The adjustable all-terrain dolly system 100 is configured to transport a load 10 over a surface. The adjustable all-terrain dolly system 100 is arranged as a kit 105.

Figure 5:
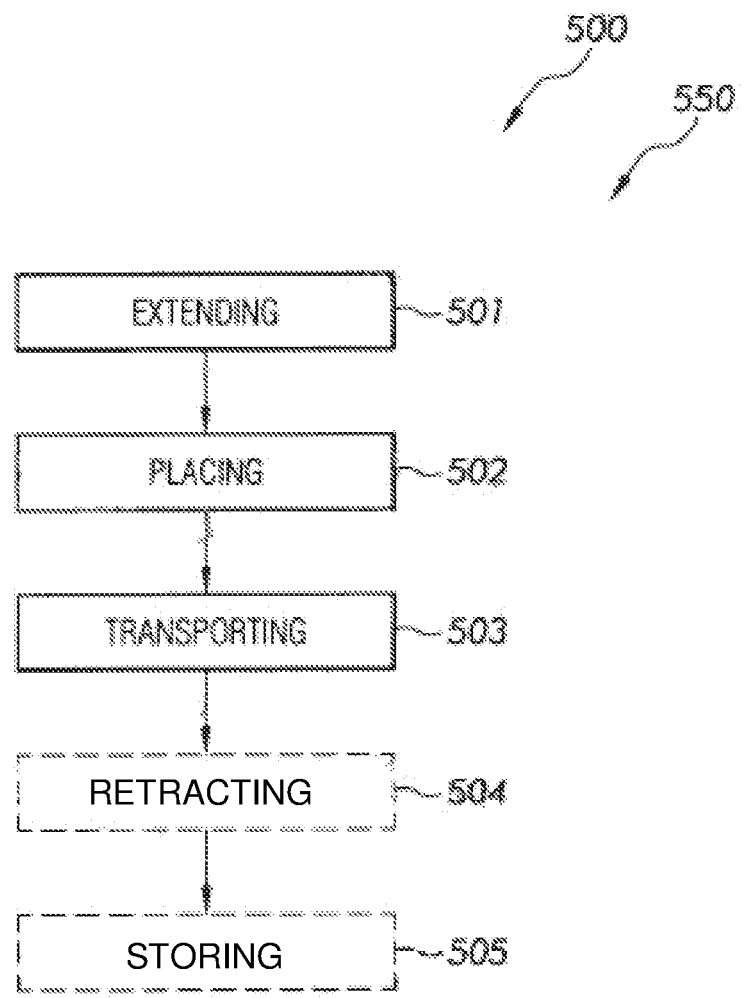
FIG. 5 is a flow diagram illustrating a method of use of the adjustable all-terrain dolly system, according to an embodiment of the present disclosure.

FIG. 5 is a flow diagram illustrating a method for transporting a load 10 over a surface, according to an embodiment of the present disclosure. In particular, the method for transporting a load 10 over a surface 500 can include one or more components or features of the adjustable all-terrain dolly system 100, as described above. As illustrated in FIG. 5, the method for transporting a load 10 over a surface 500 can include the steps of: step one 501, extending a first-adjustable cross member 126 and a second-adjustable cross member 128; step two 502, placing at least one item on the adjustable all-terrain dolly system 100; step three 503, transporting the at least one item over a surface; step four 504, retracting the first-adjustable cross member 126 and the second-adjustable cross member 128; step five 505, storing the adjustable all-terrain dolly system 100.

It should be noted that step four 504 and five 505 are optional steps and may not be implemented in all cases. Optional steps of method of use 500 are illustrated using dotted lines in FIG. 5 so as to distinguish them from the other steps of method of use. It should also be noted that the steps described in the method of use can be carried out in many different orders according to user preference. The use of the phrase "step of" should not be interpreted as the phrase "step for" in the claims herein and is not intended to invoke the provisions of 35 U.S.C. Section 112(f). It should also be noted that, under appropriate circumstances, considering such issues as design preference, user preferences, marketing preferences, cost, structural requirements, available materials, and technological advances, other methods for transporting a load over a surface (e.g., different step orders within above-mentioned list, elimination or addition of certain steps, including or excluding certain maintenance steps), are taught herein.

It follows that a dolly 100 has been described which facilitates the transport of a load across a floor or underlying surface. More specifically, the dolly 100 includes a chassis assembly 110 defining an elongated load-supporting platform and including a forward edge and an opposite rearward edge, and the chassis assembly 110 includes a frame 120 including two opposite side rails 122, 124 which extend between the forward edge and the rearward edge of the platform, and the platform has a fore-to-aft length as measured between the forward edge and the rearward edge thereof. In addition, two sets of floor-engaging wheels 164, 174 are joined to the frame 120 and are arranged beneath the load-supporting platform of the chassis assembly 110 wherein one of the two sets of floor-engaging wheels 164 or 174 is disposed adjacent one of the two opposite side rails and a second set of wheels 174 or 164 is disposed adjacent the other of the two opposite side edges of the frame 120. Further, the wheels of each of the two sets of wheels are arranged inline with one another and include a forwardmost wheel, a rearwardmost wheel and least one intermediate wheel disposed between the forwardmost and rearwardmost wheels. Each of the two sets of wheels has a front-to-rear length as measured between the front of the forwardmost wheel and the rear of the rearwardmost wheel; and each of the two sets of wheels is substantially centered between the forward and rearward edges of the platform. Further still, the front-to-rear length of each of the two sets of wheels is about one-half of the fore-to-aft length of the platform so that an appreciable portion of the platform extends between the front of the forwardmost wheel of each set of wheels and the forward edge of the platform, and an appreciable portion of the platform extends between the rear of the rearwardmost wheel of each set and the rearward edge of the platform. Moreover, each wheel of the two sets of wheels 164, 174 has a peripheral surface for engaging the floor or underlying surface as the dolly 100 is rolled therealong, and the peripheral surface of each wheel has a transverse cross section which is shaped so that as the dolly is rolled along the floor or underlying surface, the peripheral surface of each wheel engages the floor or underlying surface at a substantially single point to enhance the maneuverability of the dolly 100 as the dolly 100 is rolled across the floor or underlying surface.

The embodiments of the invention are exemplary and numerous modifications, variations and rearrangements can be readily envisioned to achieve substantially equivalent results, all of which are intended to be embraced within the spirit and scope of the invention. Accordingly, the aforedescribed embodiments are intended for the purpose of illustration and not as limitation.

The invention claimed is:

1. A dolly, comprising:
a first rail including a first front edge and a first rear edge;
a second rail including a second front edge and a second rear edge;
a first cross member extending between the first rail and the second rail;
a second cross member extending between the first rail and the second rail;
a first plurality of inline wheels, wherein each of the first plurality of inline wheels comprises a width;
a second plurality of inline wheels, wherein each of the second plurality of inline wheels comprises a width; and
wherein:
for the first rail, a first front region is defined between the first front edge and the first cross member, a first middle region is defined between the first cross member and the second cross member, wherein the first middle region comprises a width, and a first rear region is defined between the second cross member and the first rear edge;
for the second rail, a second front region is defined between the second front edge and the first cross member, a second middle region is defined between the first cross member and the second cross member, wherein the second middle region comprises a width, and a second rear region is defined between the second cross member and the second rear edge;
the first plurality of inline wheels is located directly under the first middle region, and no wheels are located directly under the first front region and the first rear region;
the width of each of the first plurality of inline wheels is less than the width of the first middle region;
the second plurality of inline wheels is located directly under the second middle region, and no wheels are located directly under the second front region and the second rear region; and
the width of each of the second plurality of inline wheels is less than the width of the second middle region.

2. The dolly of claim 1, wherein:
the first plurality of inline wheels comprises four inline wheels; and
the second plurality of inline wheels comprises four inline wheels.

3. The dolly of claim 1, wherein:
the first plurality of inline wheels has exactly four inline wheels; and
the second plurality of inline wheels has exactly four inline wheels.

4. The dolly of claim 1, wherein the first rail is parallel to the second rail.

5. The dolly of claim 1, wherein the first cross member is parallel to the second cross member.

6. The dolly of claim 1, wherein:
a length of the first cross member is adjustable; and
a length of the second cross member is adjustable.

7. The dolly of claim 6, wherein:
the length of the first cross member is telescopically adjustable; and
the length of the second cross member is telescopically adjustable.

8. The dolly of claim 6, wherein:
the first cross member comprises a first releasably-lockable fastener configured to allow the first cross member to be adjusted; and
the second cross member comprises a second releasably-lockable fastener configured to allow the second cross member to be adjusted.

9. The dolly of claim 8, wherein:
the first releasably-lockable fastener comprises a rotating fastener; and
the second releasably-lockable fastener comprises a rotating fastener.

10. The dolly of claim 1, further comprising:
a first wheel skirt arranged to skirt the first plurality of inline wheels; and
a second wheel skirt arranged to skirt the second plurality of inline wheels.

11. The dolly of claim 10, wherein:
the first wheel skirt is located wholly underneath the first middle region; and
the second wheel skirt is located wholly underneath the second middle region.

12. The dolly of claim 1, wherein:
the first rail comprises a first horizontally oriented portion and a first vertically oriented portion; and
the second rail comprises a second horizontally oriented portion and a second vertically oriented portion.

13. The dolly of claim 12, wherein:
the first vertically oriented portion extends upwardly from an outer region of the first horizontally oriented portion; and
the second vertically oriented portion extends upwardly from an outer region of the second horizontally oriented portion.

14. The dolly of claim 13, wherein:
the first vertically oriented portion extends upwardly from an outer edge of the first horizontally oriented portion; and
the second vertically oriented portion extends upwardly from an outer edge of the second horizontally oriented portion.

15. The dolly of claim 1, wherein:
a portion of the first cross member is located underneath the first rail;
a portion of the first cross member is located underneath the second rail;
a portion of the second cross member is located underneath the first rail; and
a portion of the second cross member is located underneath the second rail.

16. The dolly of claim 15, wherein:
the portion of the first cross member underneath the first rail extends to an outer edge of the first rail; and
the portion of the first cross member underneath the second rail extends to an outer edge of the second rail.

17. The dolly of claim 16, wherein:
the portion of the second cross member underneath the first rail extends to the outer edge of the first rail; and
the portion of the second cross member underneath the second rail extends to the outer edge of the second rail.

\* \* \* \* \*